(12) United States Patent
Page (10) Patent No.: US 6,512,553 B2
(45) Date of Patent: *Jan. 28, 2003

(54) ARCHITECTURE FOR A VIDEO PREAMPLIFIER WITH AN ON-SCREEN DISPLAY

(75) Inventor: Ronald W. Page, Sunnyvale, CA (US)

(73) Assignee: National Semiconductor Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,734

(22) Filed: Aug. 4, 1998

(65) Prior Publication Data

US 2001/0012010 A1 Aug. 9, 2001

(51) Int. Cl.[7] .............................. H04N 5/50; H04N 9/74
(52) U.S. Cl. ....................................... 348/569; 348/589
(58) Field of Search ................................. 348/589, 569

(56) References Cited

U.S. PATENT DOCUMENTS

| | | | | | |
|---|---|---|---|---|---|
| 5,177,612 A | * | 1/1993 | Nakamura et al. | ........... | 348/589 |
| 5,461,398 A | * | 10/1995 | Tang et al. | ................. | 345/166 |
| 5,475,443 A | * | 12/1995 | Kwon | ......................... | 348/569 |
| 5,493,340 A | * | 2/1996 | Kim | ............................ | 348/569 |
| 5,602,600 A | * | 2/1997 | Queinnec | .................... | 348/589 |
| 5,724,104 A | * | 3/1998 | Eom | .......................... | 348/589 |
| 5,995,166 A | * | 11/1999 | Kawano | ..................... | 348/691 |

* cited by examiner

Primary Examiner—Richard Hjerpe
Assistant Examiner—Duc Q Dinh
(74) Attorney, Agent, or Firm—Stallman & Pollock LLP (57) ABSTRACT

A video preamplifier having an on-screen display (OSD) capability uses one channel of an OSD input video signal to generate a blanking signal for blocking output of a video signal. When the blanking signal is asserted, the remainder two channels provide the on-screen display. The blanking signal is generated in a high speed mixer circuit including an emitter-coupled differential pair for amplifying the OSD input signal about an operating DC offset voltage and a pull down circuit for providing the blanking signal.

7 Claims, 6 Drawing Sheets

ARCHITECTURE FOR A VIDEO PREAMPLIFIER WITH AN ON-SCREEN DISPLAY

CROSS REFERENCE TO RELATED APPLICATIONS

The present application is related to U.S. patent application, entitled "HIGH SPEED VIDEO MIXER CIRCUIT", by Ronald W. Page, Ser. No. 09/129,255, filed on the same day as the present application, and assigned to National Semiconductor Corporation, which is also the assignee of the present application.

BACKGROUND OF THE INVENTION

1. Field of the Invention

The present invention relates to integrated circuits; and, in particular, the present invention relates to integrated circuit for driving a video display.

2. Discussion of the Related Art

A monitor used in a computer system is often equipped with a on-screen menu system to provide an "on-screen display" ("OSD") of one or more menus, showing current settings or functions of the monitor. When such a menu is displayed, an OSD window is typically created which interrupts or overlays at least a portion of the visible screen area of the video display. To achieve this overlay function, the video preamplifier is provided with a blanking capability which, when activated, inserts the OSD data in place of the video data while the video data is blanked.

Figure 1:
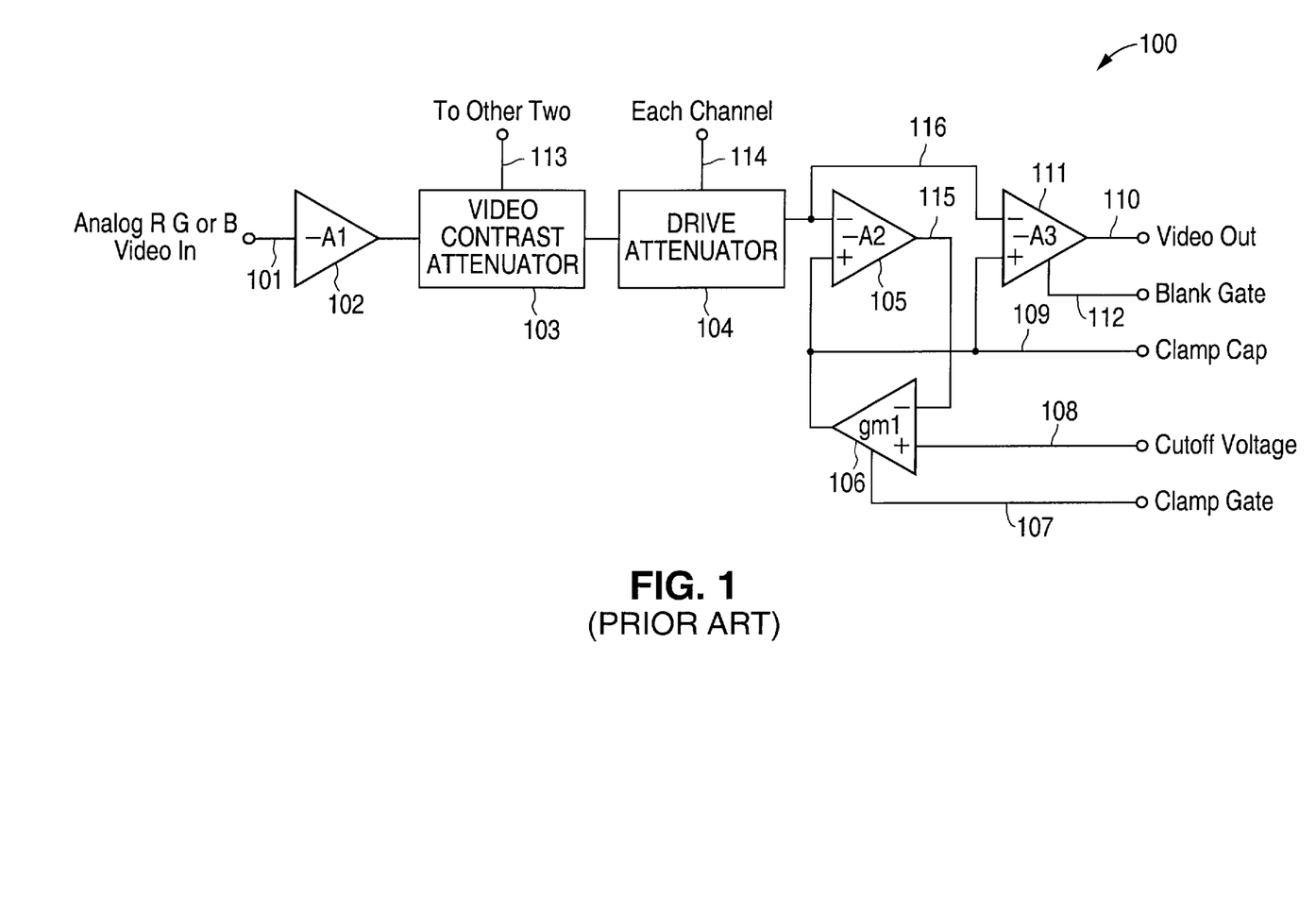
FIG. 1 is a block diagram of a single-channel video preamplifier 100 in the prior art.

FIG. 1 is a block diagram of a single-channel video preamplifier 100 in the prior art. As shown in FIG. 1, an analog signal representing one of the three color input signals or "channels" (R, G or B) is provided at terminal 101 as an input signal to video preamplifier 100. This analog signal is then amplified by an input amplifier 102. The amplified signal output of input amplifier 102 is then attenuated by video contrast attenuator 103 in accordance with a contrast attenuation signal at terminal 113 under user control. This contrast attenuation signal is typically provided externally and is common to all three channels. The contrast-attenuated signal is then adjusted in drive attenuator 104 in accordance with a channel-specific control signal at terminal 114. The output signal of drive attenuator 104 at terminal 116 is then amplified in output amplifier 105. The output signal at terminal 115 of output amplifier 105 is limited by an output signal of amplifier 106 ("clamp comparator") in response, when an external clamp signal at terminal 107 is asserted, to an externally imposed cutoff voltage at terminal 108. An external clamping capacitor (not shown) is provided coupled between terminal 109 and a reference voltage, typically ground or a supply voltage, to impose at terminal 109 a DC offset voltage to the output video signal at terminal 110. The attenuated video signal at terminal 116 is summed in amplifier 111 with the DC offset voltage at terminal 109, to provide at terminal 110 a video output signal. This video output signal at terminal 110 can be grounded by a blanking signal asserted at terminal 112. When the blanking signal at terminal 112 is asserted, i.e. the video output signal at terminal 110 is grounded, OSD data generated by an external OSD integrated circuit (not shown) is inserted at terminal 110 to provide the OSD overlay.

One disadvantage of video preamplifier 100 discussed above results from the timing and delay limitations of the blanking system, so that the quality of the on-screen display within the OSD window is compromised. In addition, in a typical high-frequency video signal path, a complex technique is necessary to inject the OSD data into terminal 110.

Figure 2:
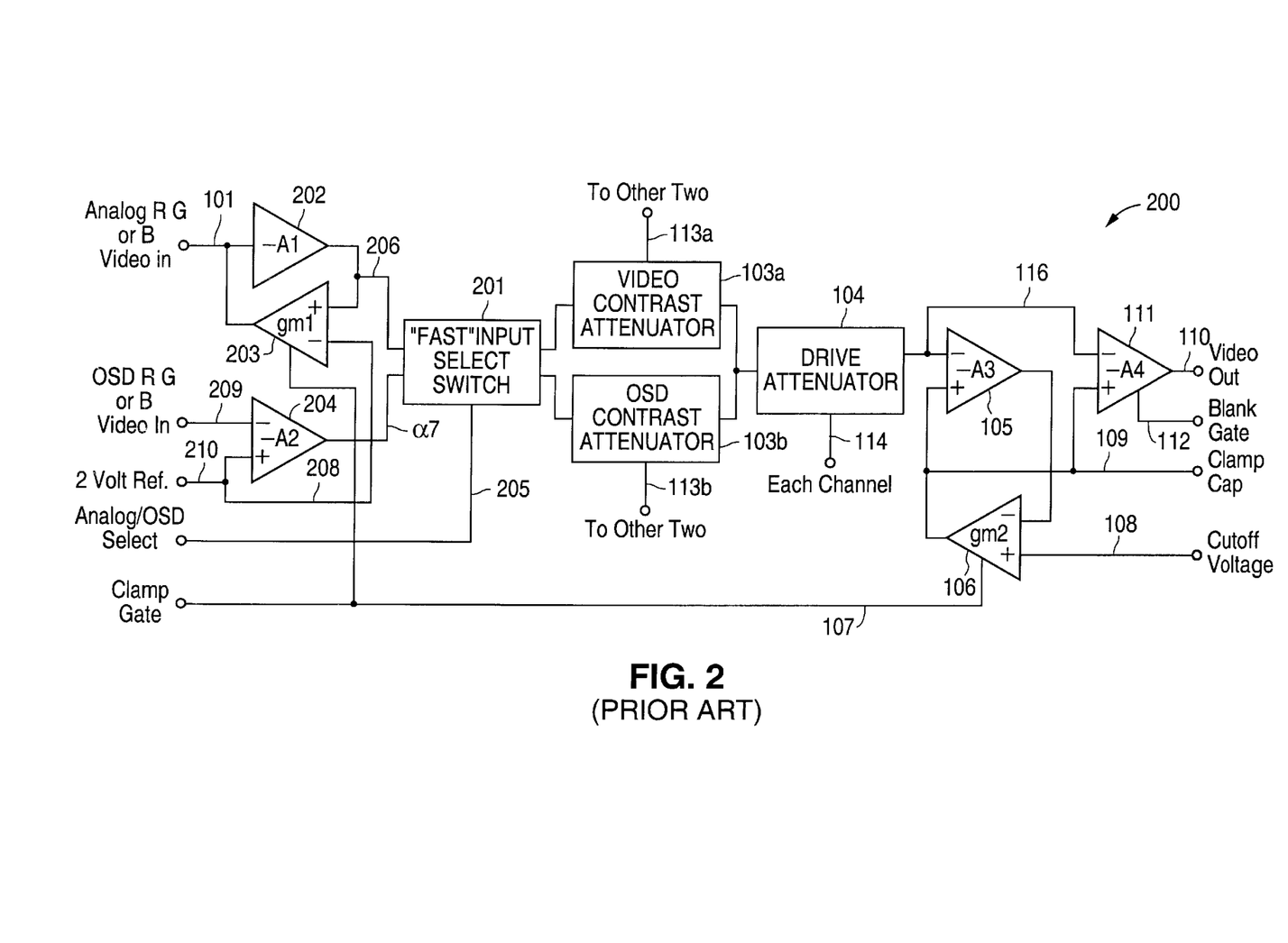
FIG. 2 is a block diagram of another prior art single-channel video preamplifier 200.

FIG. 2 is a block diagram of another prior art video preamplifier 200. To simplify description and to facilitate identification, like elements in video preamplifiers 100 and 200 are provided the same reference numerals. As shown in FIG. 2, in addition to the R, G or B input video signal at terminal 101, preamplifier 200 accepts also a corresponding R, G or B OSD input signal at terminal 209. In preamplifier 200, the video input signal received at terminal 101 is assumed to have a predetermined maximum dynamic amplitude of one volt, measured peak-to-peak. Thus, a 2-volt reference voltage ("black DC") is provided along with amplifiers 202 and 203 to clamp, when the signal at clamp gate terminal 107 is asserted, the input video signal at terminal 101 to a 2-volt DC offset or reference voltage. The video input signal of terminal 101 is thus provided at terminal 206 as an AC 700 mV peak-to-peak video signal superimposed on the DC offset voltage. The OSD input signal 209, originally at 0 to 4 volts peak-to-peak, is likewise amplified and provided with a DC offset voltage by amplifier 204, to provide an OSD input signal at terminal 207, also as an AC video signal having a maximum amplitude of 700 mV peak-to-peak. Under control of a select signal at terminal 205, a fast commutator or switch 201 is provided to select between the OSD input signal at terminal 207 and the video input signal at terminal 206. As in preamplifier 100 of FIG. 1, video contrast attenuators 103a and 103b are each provided for attenuating the corresponding one of the input video signal at terminal 206 and the input OSD signal at terminal 207. The remainder circuitry in preamplifier 200, i.e. drive attenuator 104 and amplifiers 105, 106 and 111, function in the same manner as the corresponding elements in FIG. 1 described above.

While video preamplifier 200 overcomes both the problem of poor quality on-screen display and the problem of complex OSD data insertion in video preamplifier 100, video preamplifier 200 is a more complex circuit having a higher power dissipation, a larger chip size and a higher pin count. Preamplifier 200 has a higher pin count because five pins are required per channel; namely, an R, G or B video input pin, an OSD input pin, an OSD/RGB select pin, a contrast pin and drive attenuation pin are required.

SUMMARY OF THE INVENTION

The present invention provides a low pin-count low cost video preamplifier with on-screen display (OSD) capability. The OSD system of the present invention, which receives an input video signal and an input OSD video signal, includes an input stage amplifying the input video signal; (b) an OSD input circuit (i) receiving the input OSD video signal, (ii) detecting an active component of the input OSD video signal, (iii) amplifying the input OSD video signal, and (iv) asserting a blanking signal when the active component is detected. In addition, the OSD system of the present invention includes an output stage, which receives the amplified input video signal, the amplified input OSD video signal, and the blanking signal. The output stage provides the amplified input OSD video signal as an output video signal of the OSD system, when the blanking signal is asserted, and provides the amplified input video signal as the output video signal of the OSD system, otherwise.

In one embodiment, the OSD video signal includes three channels. In that embodiment, the OSD input circuit detecting as the active component the signal strength of one of the three channels, and asserts the blanking signal when the signal strength exceeds a predetermined threshold. In that embodiment, the remainder two channels are used for providing the on-screen display.

In one embodiment, the output stage includes an input circuit, which receives the amplified input video signal and the blanking signal. This input circuit of the output stage provides an output signal which (i) is maintained at a predetermined voltage, when the blanking signal is asserted, and (ii) corresponds to the amplified input video signal, otherwise. The output signal is summed in a summing circuit with the amplified OSD input video signal.

In one embodiment, the input stage of the OSD system is provided a contrast attenuator circuit, which receives the input video signal and provides a contrast-attenuated input video signal. In addition, a drive attenuator circuit which attenuates the contrast-attenuated input video signal is also provided. Further, the output stage is provided a clamp comparator circuit. Such clamp comparator circuit can be used to clamp the output video signal to a predetermined signal strength.

The present invention is better understood upon consideration of the detailed description below in conjunction with the accompanying drawings.

DETAILED DESCRIPTION OF THE PREFERRED EMBODIMENTS

The present invention provides an integrated circuit video preamplifier with on-screen display (OSD) capability, while at the same time achieving a smaller chip size, lower power dissipation and smaller pin-count than the prior art video preamplifiers, such as video preamplifier 200 described above with respect to FIG. 2. The present invention also allows the OSD data to be displayed without incurring timing and delay limitations of the prior art video preamplifier 100 described above in conjunction with FIG. 1.

Figure 3:
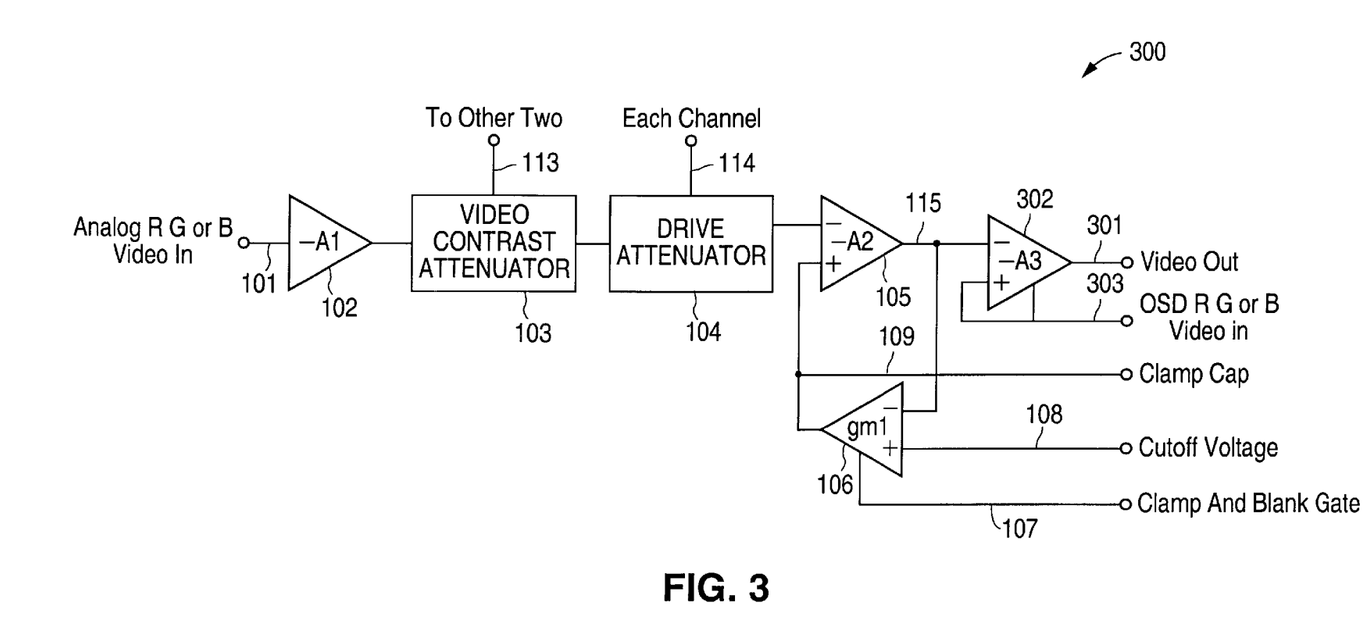
FIG. 3 is a block diagram of a single-channel video amplifier 300, in accordance with the present invention.

FIG. 3 is a block diagram of a single-channel video preamplifier 300 of the present invention. As shown in FIG. 3, an analog signal representing one of the three color input signals or "channels" (R, G or B) is provided as an input signal to preamplifier 300 at terminal 101. This analog signal is then amplified by an input amplifier 102. The amplified signal is then attenuated by video contrast attenuator 103 in accordance with a contrast attenuation signal at terminal 113 under user control. This contrast attenuation signal is typically provided externally and is common to all three channels. The contrast-attenuated signal is then adjusted in drive attenuator 104 in accordance with a channel-specific control signal at terminal 114. The output signal of drive attenuator 104 is then amplified in output amplifier 105. When an external clamp signal at terminal 107 is asserted, the output signal of output amplifier 105, provided at terminal 115, is limited by amplifier 106 according to an externally imposed cutoff voltage at terminal 108. An external clamping capacitor is coupled to terminal 109 to impose a DC offset voltage to the output video signal at terminal 115. The output video signal at terminal 115 is provided to a non-inverting input terminal of amplifier 302. Unlike video preamplifier 100 of FIG. 1, rather than a blanking signal, an OSD color signal is provided at terminal 303 as both the blanking control signal and a video input signal to a second non-inverting input terminal of amplifier 302. Amplifier 302 provides at terminal 301 the output video signal of preamplifier 300. In this embodiment, when OSD data is displayed, one of the OSD channels (i.e., signal at terminal 303) is provided at a relative high voltage to blank all video data input of all three channels. The remaining two OSD input signals in the two other channels are then used to drive the other two channels' respective output video signals to the video display.

Figure 4A:
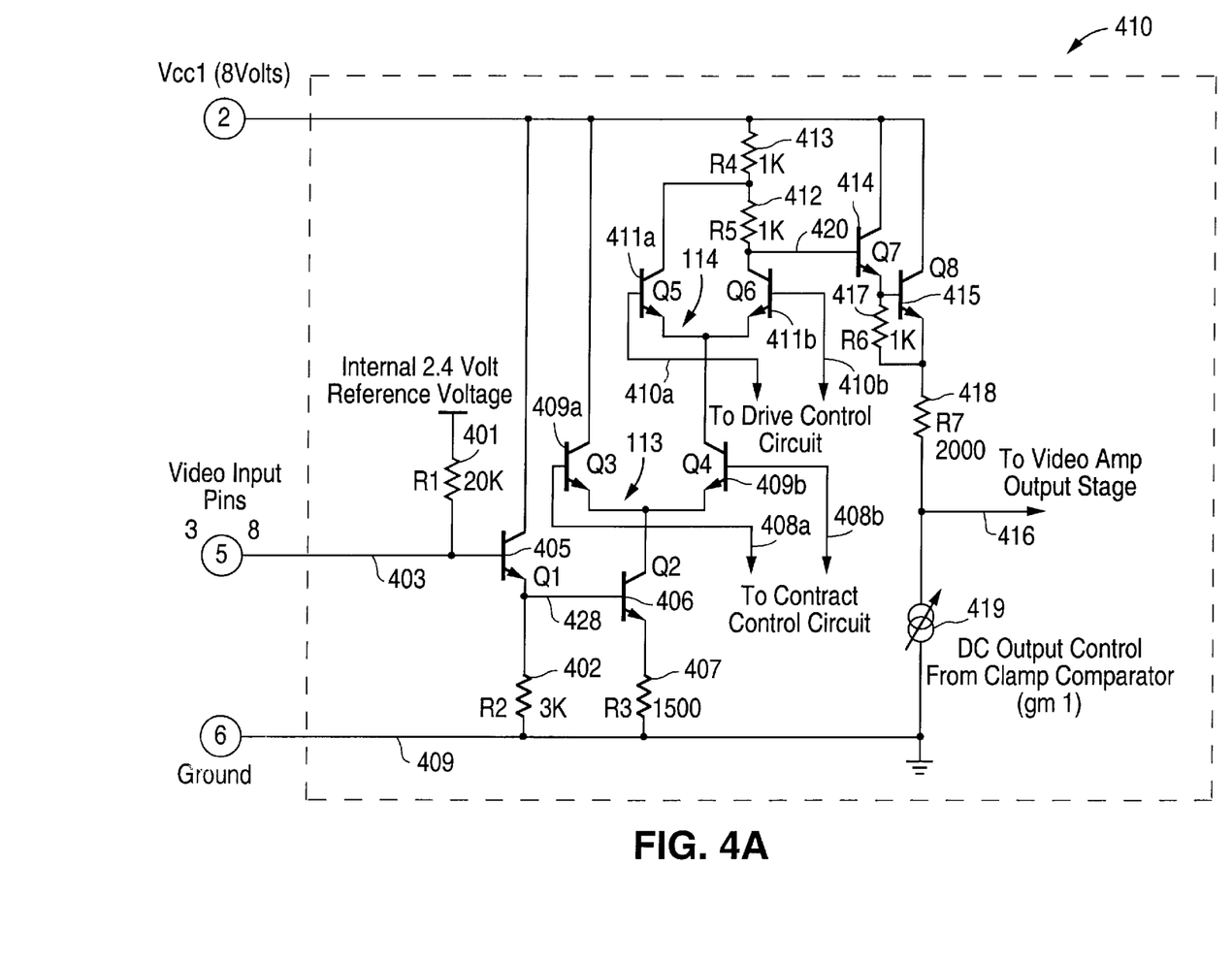
FIG. 4a shows an input stage 410 of video amplifier 400 for one channel of an input video signal, in one embodiment of the present invention.
Figure 4B:
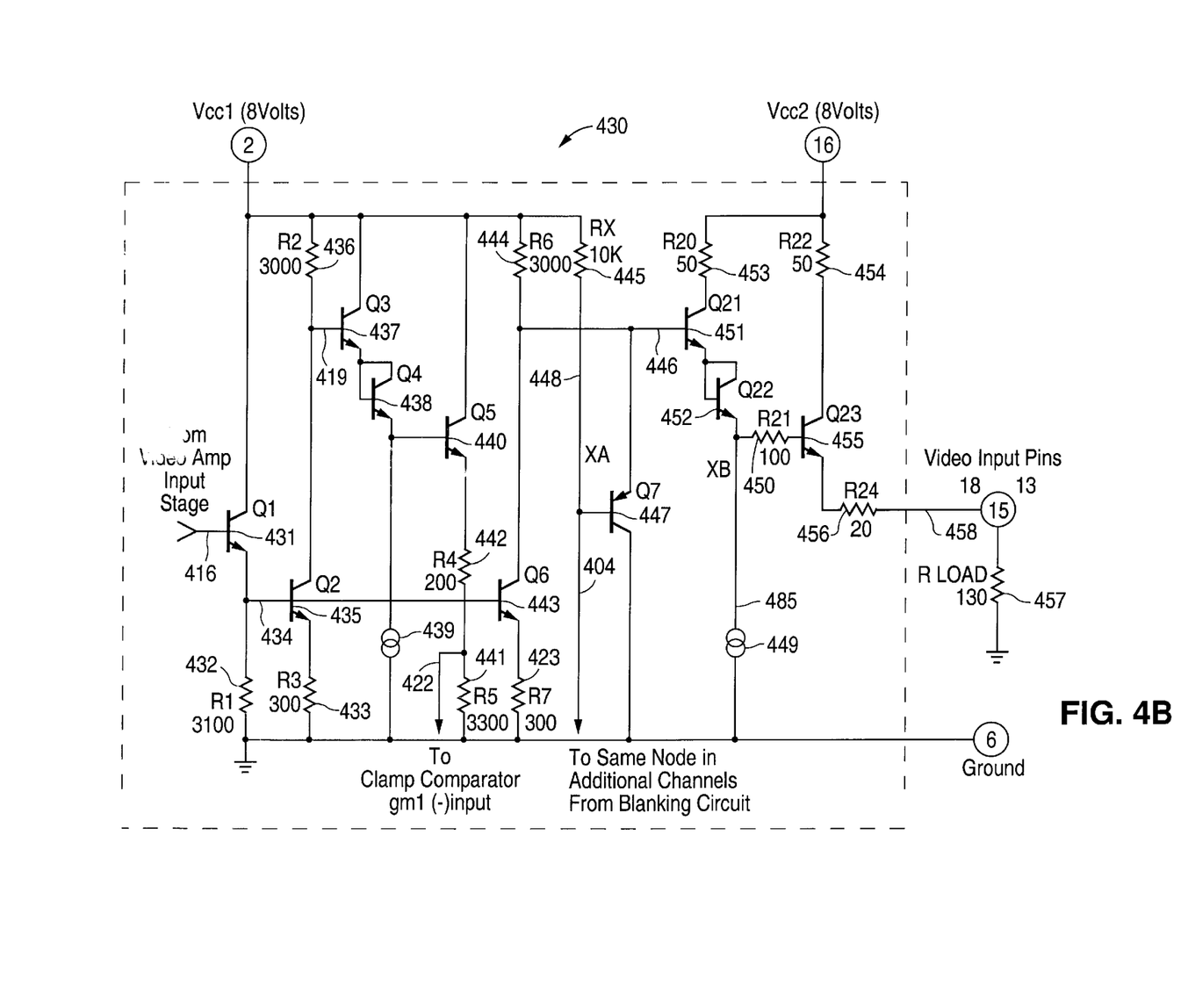
FIG. 4b shows an output stage 430 of video amplifier 400, for providing one channel of an output video signal.
Figure 4C:
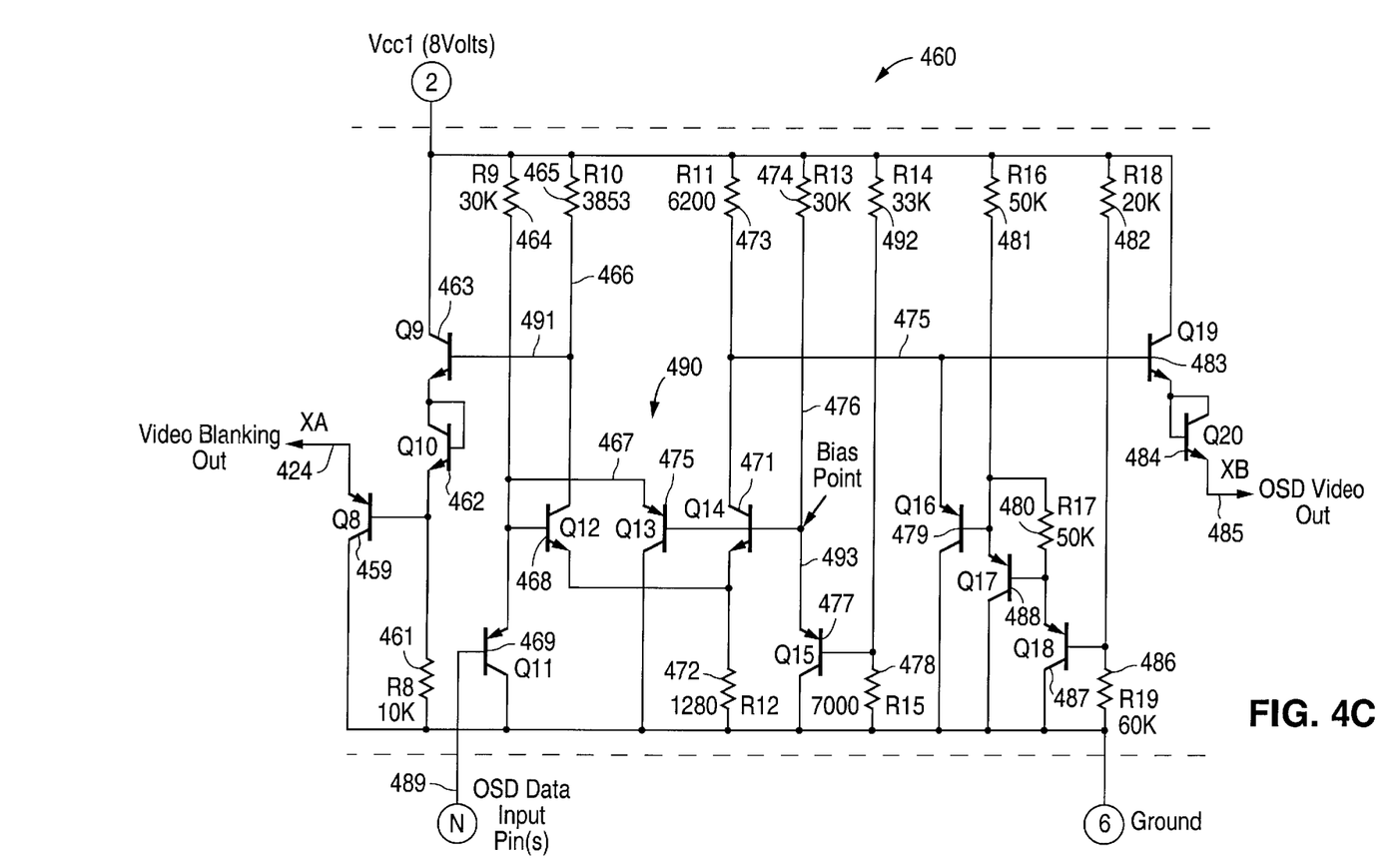
FIG. 4c shows an OSD input stage 460 of video amplifier, for one channel of an input OSD video signal.

One implementation of preamplifier 300 is shown in FIGS. 4a–4c, which are schematic circuits of a video amplifier circuit 400 in one embodiment of the present invention. FIG. 4a shows an input stage 410 of video amplifier 400 for one channel of an input video signal. As shown in FIG. 4a, a video input signal is provided at terminal 403, which is biased in this embodiment by resistor 401 to a DC offset reference voltage of 2.4 volts. The input video signal at terminal 403 is modulated by NPN transistor 405 and resistor 402 to provide a control voltage at the base terminal 421 of NPN transistor 406. The current in NPN transistor 406 is controlled by the control voltage at its base terminal 421 of NPN transistor 406 and limited by resistor 407, contrast attenuator 113 and drive control attenuator 114. In this embodiment, contrast attenuator 113 is an emitter-coupled amplifier consisting of NPN transistors 409a and 409b. Likewise, drive control attenuator 114 is an emitter-coupled amplifier consisting of NPN transistors 411a and 411b and resistors 412 and 413. An output signal, which corresponds to the signal at base terminal 421 of NPN transistor 406, attenuated by drive control attenuator 114 and contrast attenuator 113, is provided at terminal 420. The output signal at terminal 420 is amplified to provide an output signal at terminal 416, using an output amplifier which consists of NPN transistors 414 and 415, resistors 417 and 418 and a current source 419. Feedback-controlled current source 419 limits the output DC voltage at terminal 416. Current source 419 is controlled by a conventional clamp comparator circuit (not shown) receiving a clamp voltage as an input signal to its non-inverting input terminal and an amplified output signal of input stage 410 as an input signal to its inverting terminal. The amplified output signal of input stage 410 which is supplied to the clamp comparator circuit is taken from output stage 430, which is shown in FIG. 4b below.

FIG. 4b is an output stage 430 of video amplifier 400, for providing one channel of the output video signal. As shown in FIG. 4b, the output signal at terminal 416 of input stage 410 is received into output stage 430 at the base terminal of NPN transistor 431 which, in conjunction with resistor 432 (connected between transistor 431's emitter terminal and ground), provides an amplified signal at terminal 434. The amplified signal at terminal 434 is applied to the base terminals of NPN transistors 435 and 443. NPN transistor 435, in conjunction with resistors 436 and 433, level-shifts the amplified signal at terminal 434 to provide a modulating signal at terminal 459. This modulating signal at terminal 459 modulates the current in current source 439 through NPN transistor 437 and diode 438, so as to provide a controlled current to the base terminal of NPN transistor 440. Together with the voltage divider of resistors 442 and 441, which are connected in series with the emitter terminal of NPN transistor 440, NPN transistor 440 provides at terminal 422 the feedback signal to the non-inverting input of the clamp comparator mentioned above.

The amplified signal at terminal 434 is also level-shifted by the action of NPN transistor 443 and resistors 423 and 444 to provide a level-shifted signal at terminal 446. This level-shifted signal at terminal 446 modulates, through NPN transistor 451 and diode 452, the current in current source 449 to provide a control current at the base terminal of NPN transistor 455. At terminal 485 of resistor 450, the control current is summed with an OSD input current signal, which is provided by an OSD input circuit 460 shown in FIG. 4c and described below. The summed signal (XB) at terminal 485 of resistor 450 is amplified by NPN transistor 455 to provide at terminal 458 the output signal of video output stage 430. Output load 457, resistor 454 and resistor 456 provide a DC quiescent operating voltage at terminal 458.

In output stage 430, an PNP transistor 447 is provided to pull terminal 446 to near ground reference, when a control signal at the base terminal 424 of PNP transistor 447 is asserted. By pulling terminal 446 to ground, the amplified input signal received at terminal 416 from input stage 410 is prevented from propagating through output stage 430. Base terminal 424 ("blanking input terminal") of PNP transistor 447 is connected in common with the base terminals of similarly provided PNP transistors in the other two channels. Thus, when the control signal at blanking input terminal 424 is asserted, the output signal from each channel (e.g. terminal 458 of video output stage 460 includes only the contribution by the corresponding OSD channel.

The OSD input signal for each channel is mixed into the video signal of the corresponding channel in output stage 430 by an OSD input circuit 460 shown in FIG. 4c. OSD input circuit 460 is a high speed video mixer circuit. As shown in FIG. 4c, one channel of an OSD input video signal is received into input circuit 460 at the base terminal 489 of PNP transistor 469 which, in conjunction with resistor 464, amplifies the input signal to drive one input terminal of an emitter-coupled amplifier 490. Emitter-coupled amplifier 490 consists of emitter-coupled NPN transistors 468 and 471, and resistors 465, 472 and 473. The other input terminal of emitter-coupled amplifier 490, i.e., base terminal 493 of NPN transistor 471 is biased by a reference voltage, which is created by amplifying the voltage at the voltage divider of resistors 492 and 478 in the amplifier consisting of PNP transistor 477 and resistor 474. PNP transistor 470 is provided to limit the voltage swing at the emitter terminal of PNP transistor 469 between ground voltage and a base-emitter voltage ($V_{BE}$) drop above the bias voltage at terminal 493, thereby preventing NPN transistor 468 from going into saturation.

In OSD input circuit 460, an non-inverting output signal is provided at the base terminal 491 of NPN transistor 463 which, in conjunction with diode 462 and resistor 461, provides an output control signal at the base terminal of PNP transistor 459. The emitter terminal of PNP transistor 459 is coupled to terminal 424, which is the common blanking input terminal for all three channels, as described above. Thus, when the OSD input signal received at terminal 489 of the PNP transistor 469 is held at a high voltage, the current flowing in NPN transistor 468 is increased, so that voltage at terminal 491 drops, resulting a decreased voltage at the base terminal of PNP transistor 459. PNP transistor 459 thus pulls the blanking input terminal to near ground voltage. As a result, PNP transistor 447 (FIG. 4b) pulls terminal 446 to near the ground reference, thereby blanking output circuit 460's input video signal.

A non-inverting output signal, corresponding to the OSD input signal at terminal 489, is tapped from terminal 475 of emitter-coupled amplifier 490. Terminal 475 is biased to have a DC offset voltage determined by the voltage divider of resistors 482 and 486 plus the approximate 3 $V_{BE}$'s voltage drop contributed by PNP transistors 487, 488 and 479. The output voltage at terminal 475 modulates a current signal flowing in NPN transistor 483 and diode 484. This current signal, which represents an amplified signal of the OSD input video signal at terminal 489, is summed at terminal 485 (i.e., signal XB) of resistor 450 (FIG. 4b) with the amplified input video signal at terminal 446 to provide at terminal 458 the total output signal of output stage 430.

The above detailed description are provided to describe the specific embodiments of the present invention above, and is not intended to be limiting. Numerous variations and modifications are possible within the scope of the present invention. The present invention is defined by the following claims.

I claim:

1. A single-channel video preamplifier circuit that receives an analog video input signal representing one of a plurality of color input signals, each color input signal corresponding to one of a plurality of video signal channels, the video preamplifier circuit comprising:

(a) a video amplifier input stage circuit that includes
      (i) an input amplifier that amplifies the video input signal to provide an amplified input video signal;
      (ii) a contrast attenuator that attenuates the amplified input video signal in response to a contrast attenuation control signal to provide a contrast-attenuated input video signal;
      (iii) a drive control attenuator that adjusts the contrast-attenuated input video signal in response to a drive control signal to provide an adjusted contrast-attenuated input video signal;
      (iv) an output amplifier that receives the adjusted contrast-attenuated input video signal and a limiting signal as inputs and provides a limited DC offset video signal; and
      (v) a feed-back controlled current source that provides the limiting signal to the output amplifier;

(b) a clamp comparator circuit that receives a clamp voltage at its non-inverting input and an amplified output signal at its inverting input to provide a clamp comparator output signal that controls the feed-back controlled current source of the video amplifier input stage; and (c) a video amplifier output stage that receives the limited DC offset video signal as a first input signal and an OSD color signal as a second input to provide a video output signal, the limited DC offset video signal being blanked in response to assertion of the OSD color signal.

2. A single-channel video amplifier circuit as in claim 1, and wherein the input amplifier comprises:

a first NPN transistor (405) having its base connected to receive the video input signal, said base having a first resistor (401) connected thereto, its emitter coupled to a ground voltage supply via a second resistor (402) and its collector coupled to a positive voltage supply; and a second NPN transistor (406) having its base connected to the emitter of the first NPN transistor and its emitter coupled to the ground voltage supply via a third resistor (407).

3. A single-channel video amplifier circuit as in claim 2, and wherein the contrast attenuator comprises: third and fourth NPN transistors (409a, 409b), the emitter of the third NPN transistor and the emitter of the fourth NPN transistor being commonly-connected to the collector of the second NPN transistor, the collector of the third NPN transistor being connected to the positive voltage supply, the base of the third NPN transistor and the base of the fourth NPN transistor being coupled to a contrast control circuit.

4. A single-channel video amplifier circuit as in claim 3, and wherein the drive attenuator comprises:

fifth and sixth NPN transistors (411a, 411b), the emitter of the fifth NPN transistor and the emitter of the sixth NPN transistor being commonly-connected to the collector of the fourth NPN transistor, a fourth resistor (412) having a first terminal connected to the collector of the fifth NPN transistor and a second terminal connected to the collector of the sixth NPN transistor; and a fifth resistor (413) having a first terminal connected to the positive supply voltage and a second terminal connected to the collector of the fifth NPN transistor and to the first terminal of the fourth resistor, the base of the fifth NPN transistor and the base of the sixth NPN transistor being coupled to a drive control circuit.

5. A single-channel video amplifier circuit as in claim 4, and wherein the output amplifier comprises:

Seventh and eighth NPN transistors, the seventh NPN transistor having its base connected to the collector of the sixth NPN transistor, its emitter connected to the base of the eighth NPN transistor and coupled to the emitter of the eighth NPN transistor via a sixth resistor (417), and its collector connected to the positive supply voltage, the eighth NPN transistor having its emitter connected to a first terminal of a seventh resistor (418) and its collector connected to the positive supply voltage, a second terminal of the seventh resistor being connected to the feed-back controlled current source.

6. A single-channel video preamplifier circuit that receives an analog video input signal representing one of a plurality of color input signals, each color input signal corresponding to one of a plurality of video signal channels, the video preamplifier circuit comprising:

(a) a video amplifier input stage that includes
   (i) an input amplifier that amplifies the video input signal to provide an amplified input video signal;
   (ii) a contrast attenuator that attenuates the amplified input video signal in response to a contrast attenuation control signal to provide a contrast-attenuated input video signal;
   (iii) a drive control attenuator that adjusts the contrast-attenuated input video signal in response to a drive control signal to provide an adjusted contrast-attenuated input video signal;
   (iv) an output amplifier that receives the adjusted contrast-attenuated input video signal and a limiting signal as inputs and provides a limited DC offset video signal;

(b) a clamp comparator circuit that receives a clamp voltage at its non-inverting input and an amplified output signal at its inverting input to provide a clamp comparator output signal that controls the limiting signal provided as an input to the output amplifier of the video amplifier input stage; and (c) a video amplifier output stage that includes
   (i) a first NPN transistor (431) having its based coupled to receive the limited DC offset video signal from the video amplifier input stage, its emitter coupled to a ground supply voltage via a first resistor (432) and its collector connected to a first positive supply voltage;
   (ii) a second NPN transistor (435) having its base connected to the emitter of the first NPN transistor, its emitter coupled to the ground supply voltage via a second resistor (433) and its collector coupled to the first positive supply voltage via a third resistor (436);
   (iii) a first diode (438) having a first terminal and a second terminal;
   (iv) a third NPN transistor (437) having its base connected to the collector of the second NPN transistor, its emitter connected to the first terminal of the diode, and its collector connected to the first positive supply voltage;
   (v) a first current source (439) connected between the first diode and the ground supply voltage;
   (vi) a fourth NPN transistor (440) having its base connected to the first diode its emitter coupled to the ground supply voltage via fourth and fifth resistors (442,441);
   (vii) a fifth NPN transistor (443) having its base connected to the emitter of the first NPN transistor, its emitter coupled to the first positive supply voltage via a seventh resistor (423), and its collector coupled to the first positive supply voltage via an eighth resistor (444);
   (ix) a first PNP transistor (447) having its base coupled to the first positive supply voltage via a ninth resistor (445) and its collector connected to the ground supply voltage;
   (x) a sixth NPN transistor (451) having its base connected to the emitter of the first PNP transistor and coupled to the positive supply voltage via the ninth resistor, its collector coupled to a second positive supply voltage via a tenth resistor (453) and its emitter connected to a first terminal of a second diode (452), a second terminal of the second diode being coupled to the ground supply voltage via a second current source (449);
   (xi) a seventh NPN transistor (455) having its base coupled to the second terminal of the second diode via an eleventh resistor (450), its emitter coupled to a video output pin via a twelfth resistor (456), and its collector coupled to the second positive supply voltage via a thirteenth resistor (454); and
   a fourteenth resistor (457) connected to the video output pin.

7. A single-channel video preamplifier circuit as in claim 6, and wherein the first positive supply voltage is the same as the second positive supply voltage.

* * * * *